(12) United States Patent
Lu et al.

(10) Patent No.: US 10,778,031 B2
(45) Date of Patent: Sep. 15, 2020

(54) CHARGER, TERMINAL DEVICE, AND CHARGING SYSTEM

(71) Applicant: Huawei Technologies Co., Ltd., Shenzhen (CN)

(72) Inventors: Haizhao Lu, Shenzhen (CN); Shuo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/715,894

(22) Filed: Dec. 16, 2019

(65) Prior Publication Data

US 2020/0136402 A1 Apr. 30, 2020

Related U.S. Application Data

(63) Continuation of application No. 15/722,427, filed on Oct. 2, 2017, now Pat. No. 10,601,242, which is a
(Continued)

(30) Foreign Application Priority Data

Mar. 30, 2015 (CN) .......................... 2015 1 0145136

(51) Int. Cl.
*H02J 7/00* (2006.01)
*H02J 7/02* (2016.01)
(Continued)

(52) U.S. Cl.
CPC ............. *H02J 7/027* (2013.01); *H02H 3/087* (2013.01); *H02J 5/00* (2013.01); *H02J 7/0029* (2013.01);
(Continued)

(58) Field of Classification Search
CPC .... H02J 7/0029; H02J 7/00304; H02J 7/0021; H02J 7/0031; H02J 2007/004;
(Continued)

(56) References Cited

U.S. PATENT DOCUMENTS

| 4,713,719 A | 12/1987 | Kugelman |
| 2005/0057220 A1* | 3/2005 | Miwa .................... H02J 7/0021 320/116 |

(Continued)

FOREIGN PATENT DOCUMENTS

| CN | 201038789 Y | 3/2008 |
| CN | 203251070 U | 10/2013 |

(Continued)

OTHER PUBLICATIONS

Foreign Communication From a Counterpart Application, European Application No. 19186337.2, Extended European Search Report dated Jan. 29, 2020, 7 pages.
(Continued)

*Primary Examiner* — David V Henze-Gongola
*Assistant Examiner* — Mohammed J Sharief
(74) *Attorney, Agent, or Firm* — Conley Rose, P.C.

(57) ABSTRACT

A charger, including a power conversion circuit, a charging interface, and an overcurrent protection circuit, where the charging interface includes a power cable, a ground cable, a signal cable, a resistor and a switch device, where a first end of the resistor is connected to the power cable, a second end of the resistor is connected to the signal cable, in a process in which the charger charges a terminal device and when a difference between a voltage of a first end of the switch device and a voltage of a second end of the switch device is greater than or equal to a first voltage threshold, the second end and a third end of the switch device are connected such that the power cable and the ground cable are connected to
(Continued)

generate an overcurrent, and the overcurrent protection circuit controls the power conversion circuit to stop current output.

18 Claims, 5 Drawing Sheets

Related U.S. Application Data continuation of application No. PCT/CN2015/094652, filed on Nov. 16, 2015.

(51) Int. Cl.
*H02H 3/087* (2006.01)
*H02J 7/04* (2006.01)
*H02J 5/00* (2016.01)

(52) U.S. Cl.
CPC ............ *H02J 7/0047* (2013.01); *H02J 7/04* (2013.01); *H02J 7/00304* (2020.01)

(58) Field of Classification Search
CPC .... H02J 2007/0037; H02J 5/00; H02J 7/0047; H02J 7/04; H01M 10/48; H02H 3/087; G01R 31/3658; G01R 31/3682; G01R 19/16542; G01R 31/3631; G01R 31/3648; Y02E 60/12
USPC .......................... 320/134; 324/429, 433, 434
See application file for complete search history.

(56) References Cited

U.S. PATENT DOCUMENTS

| | | | |
|---|---|---|---|
| 2006/0186859 A1* | 8/2006 | Fujikawa | H02J 7/00 320/134 |
| 2007/0222416 A1 | 9/2007 | Sato | |
| 2008/0164837 A1 | 7/2008 | Lu et al. | |
| 2010/0085014 A1 | 4/2010 | Saeki et al. | |
| 2010/0165528 A1* | 7/2010 | Chan | H04L 12/40045 361/86 |
| 2010/0194398 A1 | 8/2010 | Kawasumi et al. | |
| 2011/0112782 A1 | 5/2011 | Majima et al. | |
| 2011/0181246 A1* | 7/2011 | Tae | H02J 7/0014 320/118 |
| 2011/0187329 A1 | 8/2011 | Majima et al. | |
| 2014/0313792 A1 | 10/2014 | Nate et al. | |
| 2015/0002077 A1* | 1/2015 | Wang | H02J 7/00 320/107 |
| 2016/0064978 A1 | 3/2016 | Lei et al. | |
| 2016/0197500 A1 | 7/2016 | Liang | |
| 2016/0336779 A1* | 11/2016 | Hu | H02J 7/00 |
| 2018/0019587 A1* | 1/2018 | Chen | H02H 7/1213 |
| 2019/0326760 A1* | 10/2019 | Sheng | H02J 1/10 |

FOREIGN PATENT DOCUMENTS

| | | |
|---|---|---|
| CN | 203339784 U | 12/2013 |
| CN | 103683388 A | 3/2014 |
| CN | 203491732 U | 3/2014 |
| CN | 104348214 A | 2/2015 |
| CN | 104393627 A | 3/2015 |
| CN | 104767260 A | 7/2015 |
| EP | 3021449 A1 | 5/2016 |
| JP | 2012249499 A | 12/2012 |
| WO | 2014161409 A1 | 10/2014 |

OTHER PUBLICATIONS

Machine Translation and Abstract of Chinese Publication No. CN103683388, dated Mar. 26, 2014, 25 pages.
Machine Translation and Abstract of Chinese Publication No. CN104348214, dated Feb. 11, 2015, 21 pages.
Machine Translation and Abstract of Chinese Publication No. CN104767260, dated Jul. 8, 2015, 49 pages.
Machine Translation and Abstract of Chinese Publication No. CN201038789, dated Mar. 19, 2008, 4 pages.
Machine Translation and Abstract of Chinese Publication No. CN203339784, dated Dec. 11, 2013, 7 pages.
Foreign Communication From a Counterpart Application, Chinese Application No. 201510145136.6, Chinese Search Report dated Aug. 25, 2016, 2 pages.
Foreign Communication From a Counterpart Application, Chinese Application No. 201510145136.6, Chinese Office Action dated Sep. 2, 2016, 3 pages.
Foreign Communication From a Counterpart Application, PCT Application No. PCT/CN2015/094652, English Translation of International Search Report dated Feb. 15, 2016, 2 pages.
Foreign Communication From a Counterpart Application, PCT Application No. PCT/CN2015/094652, English Translation of Written Opinion dated Feb. 15, 2016, 7 pages.
Foreign Communication From a Counterpart Application, European Application No. 15887274.7, Extended European Search Report dated Feb. 22, 2018, 5 pages.

\* cited by examiner

CHARGER, TERMINAL DEVICE, AND CHARGING SYSTEM

CROSS-REFERENCE TO RELATED APPLICATIONS

This application is a continuation application of U.S. patent application Ser. No. 15/722,427, filed on Oct. 2, 2017, which is a continuation application of International Patent Application No. PCT/CN2015/094652 filed on Nov. 16, 2015. The International Patent Application claims priority to Chinese Patent Application No. 201510145136.6 filed on Mar. 30, 2015. All of the afore-mentioned patent applications are hereby incorporated by reference in their entireties.

TECHNICAL FIELD

The present disclosure relates to the field of circuits, and in particular, to a charger, a terminal device, and a charging system in the field of circuits.

BACKGROUND

As mobile terminals such as smartphones and tablet computers gradually develop towards large-screen, battery capacity required by mobile terminals increasingly grows. To control a charging time not to be excessively long, high-power chargers start to be widely used.

Because a charging current of a high-power charger is relatively large, a short circuit is easily caused in a universal serial bus (USB), and in particular, in a Micro USB, and as a result, a USB or Micro USB interface is overheated and fused. Currently, a USB or Micro USB interface commonly used in a mobile terminal has a compact size, a user easily brings in a foreign matter in a usage process, and non-standard insertion and removal of a user also cause metal shell elements to rub to generate metal dust and the like, which all cause a charging short circuit in a charging process. Short circuits are distinguished by a high degree and a low degree, a short circuit of a relatively high degree may cause a relatively large current to ground, and is easily detected and avoided, but a short circuit of a slight degree causes only a relatively small current to ground, and is referred to as a micro short circuit.

To avoid a risk of a charging short circuit, currently, a charger of a mobile terminal generally has an overcurrent detection and protection function. Because a working current of a high-power charger is relatively large, a maximum current set for overcurrent detection is also relatively large. As a result, when a micro short circuit occurs in a charger, an overcurrent protection function may not be triggered. The micro short circuit cannot trigger overcurrent protection of the charger, but heat continuously generated by a small current generated by the micro short circuit can still accumulate to a relatively high temperature, and as a result, security accidents such as fusing, smoking, and fire outbreak occur on a USB or Micro USB plug or a Micro USB charging interface of a mobile terminal.

To avoid a risk of a charging micro short circuit, in another solution, a positive temperature coefficient (PTC) thermistor is built in a USB or Micro USB connector of a charging cable, and when a temperature is excessively high, a resistance value of the PTC thermistor connected to the charging cable in series increases to limit an excessively large charging current in order to avoid smoking and burning, or a negative temperature coefficient (NTC) thermistor is built in a USB or Micro USB connector of a charging cable, and when a temperature is excessively high, a resistance value of the NTC thermistor connected to the ground decreases to trigger overcurrent protection of a charger.

However, a position at which a micro short circuit usually occurs is located at an inner spring plate of an interface that protrudes at a USB or Micro USB end of a charging cable. However, the PTC thermistor or the NTC thermistor are disposed in a plastic body at the USB or Micro USB end of the charging cable, and a distance exists between the position at which the micro short circuit usually occurs and the position at which the PCT thermistor or the NTC thermistor are disposed. When a micro short circuit occurs at the spring plate, a temperature of the spring plate is relatively high, but a temperature sensed at the PTC thermistor or the NTC thermistor is insufficient and cannot trigger an impedance change of the PTC thermistor or the NTC thermistor, or only a resistance value of the PTC thermistor is enabled to increase so that charging decelerates. In this case, the micro short circuit easily causes the plastic body at the USB or Micro USB end of the charging cable to fuse or become black, which brings in a potential security risk for a user.

SUMMARY

Embodiments of the present disclosure provide a charger, a terminal device, and a charging system such that a micro short circuit that occurs in a charging circuit can be detected and a charging process can be controlled, thereby improving charging security.

According to a first aspect, a charger is provided, including a power conversion circuit, a charging interface, and an over current protection circuit, where the power conversion circuit includes a transformer and a rectifier, an alternating current is input from a primary side of the transformer, and is induced to a secondary side of the transformer by the primary side of the transformer, and a direct current is output from the secondary side of the transformer after the alternating current is rectified by the rectifier. The charging interface includes a power cable, a ground cable, and a signal cable, where a positive electrode of the rectifier is connected to the power cable, and a negative electrode of the rectifier is connected to the ground cable. The overcurrent protection circuit includes an overcurrent detection circuit and a pulse width modulation (PWM) control chip, where the overcurrent detection circuit is configured to enable the PWM control chip to control the primary side of the transformer to stop inducing the alternating current to the secondary side of the transformer when it is detected that a current of the secondary side of the transformer is greater than or equal to a first current threshold that is preset, where the first current threshold is greater than a rated output current value of the charger, and the charger further includes a resistor and a switch device, where a first end of the resistor is connected to the power cable, and a second end of the resistor is connected to the signal cable. A first end of the switch device is connected to the signal cable, a second end of the switch device is connected to the power cable, a third end of the switch device is connected to the ground cable, and in a case in which a difference between a voltage of the first end of the switch device and a voltage of the second end of the switch device is greater than or equal to a preset first voltage threshold, the second end of the switch device and the third end of the switch device are connected, and in a process in which the charger charges a terminal device, in a case in which the difference between the voltage of the first end of the switch device and the voltage of the second end of the switch device is greater than or equal to the first voltage threshold, the second end of the switch device and the third end of the switch device are connected such that the power cable and the ground cable are connected. The current, detected by the overcurrent detection circuit, of the secondary side of the transformer is greater than or equal to the first current threshold such that the PWM control chip controls the primary side of the transformer to stop inducing the alternating current to the secondary side of the transformer, where the first voltage threshold is greater than 0 volts (V) and is less than an output voltage value of the power cable.

With reference to the first aspect, in a first possible implementation manner of the first aspect, the charger further includes a voltage control chip and a power supply module that supplies power to the voltage control chip, where a first end of the voltage control chip is connected to the signal cable, a second end of the voltage control chip is connected to the first end of the switch device, a third end of the voltage control chip is connected to the power supply module, the voltage control chip is configured to output a low voltage at the second end of the voltage control chip when a voltage of the first end of the voltage control chip is less than or equal to a second voltage threshold such that the second end of the switch device and the third end of the switch device are connected, and the power cable and the ground cable are connected, the current, detected by the overcurrent detection circuit, of the secondary side of the transformer is greater than or equal to the first current threshold such that the PWM control chip controls the primary side of the transformer to stop inducing the alternating current to the secondary side of the transformer, and the second voltage threshold is greater than 0 V and is less than a designed minimum output voltage value of the power cable.

With reference to the first aspect or the first possible implementation manner of the first aspect, in a second possible implementation manner of the first aspect, the switch device includes at least one device of a p-channel metal-oxide-semiconductor field-effect transistor (PMOSFET), an electromagnetic relay, a thyristor, a triode, or a controllable silicon element.

With reference to the first aspect, the first possible implementation manner of the first aspect, or the second possible implementation manner of the first aspect, in a third possible implementation manner of the first aspect, the signal cable includes at least one of a positive voltage data cable (D+), a negative voltage data cable (D−), a dead-end ID, or a positive receiving differential bus 1 (RX1+), a negative receiving differential bus 1 (RX1−), a positive receiving differential bus 2 (RX2+), a negative receiving differential bus 2 (RX2−), a positive transmitting differential bus 1 (TX1+), a negative transmitting differential bus 1 (TX1−), a positive transmitting differential bus 2 (TX2+), a negative transmitting differential bus 2 (TX2−), a sideband signal cable 1 (SBU1), a sideband signal cable 2 (SBU2), a configuration channel signal cable 1 (CC1), or a configuration channel signal cable 2 (CC2) of a Type C interface defined in the USB 3.1 specification.

According to a second aspect, an embodiment of the present disclosure provides a charger, including a power conversion circuit, a charging interface, and an overcurrent protection circuit, where the power conversion circuit includes a transformer and a rectifier, an alternating current is input from a primary side of the transformer, and is induced to a secondary side of the transformer by the primary side of the transformer, and a direct current is output from the secondary side of the transformer after the alternating current is rectified by the rectifier. The charging interface includes a power cable, a ground cable, and a signal cable, where a positive electrode of the rectifier is connected to the power cable, and a negative electrode of the rectifier is connected to the ground cable. The overcurrent protection circuit includes an overcurrent detection circuit and a PWM control chip, where the overcurrent detection circuit is configured to enable the PWM control chip to control the primary side of the transformer to stop inducing the alternating current to the secondary side of the transformer when it is detected that a current of the secondary side of the transformer is greater than or equal to a first current threshold that is preset, where the first current threshold is greater than a rated output current value of the charger, and the charger further includes a resistor, a switch device, and an isolation control device, where a first end of the resistor is connected to the power cable, and a second end of the resistor is connected to the signal cable. The overcurrent protection circuit further includes a metal-oxide-semiconductor field effect transistor (MOSFET), a first end of the MOSFET is connected to a control pin of the PWM control chip, and a second end of the MOSFET is connected to the primary side of the transformer to control working of the primary side of the transformer. When a voltage of the first end of the MOSFET is less than or equal to a third voltage threshold, the MOSFET is turned off so that the primary side of the transformer stops inducing the alternating current to the secondary side of the transformer, where the third voltage threshold is greater than 0 V and is less than a working voltage of the PWM control chip. A first end of the switch device is connected to the signal cable, a second end of the switch device is connected to a first input end of the isolation control device, and a third end of the switch device is connected to the ground. When a voltage difference between a voltage of the first end of the switch device and a voltage of the second end of the switch device is greater than or equal to a preset first voltage threshold, the switch device is turned on to trigger the isolation control device to work, where the first voltage threshold is greater than 0 V and is less than an output voltage value of the power cable, and a second input end of the isolation control device is connected to the power cable, a first output end of the isolation control device is connected to the control pin of the PWM control chip, a second output end of the isolation control device is connected to the ground, and when the switch device is turned on, the isolation control device is triggered to work such that a voltage of the first output end of the isolation control device is less than the third voltage threshold.

With reference to the second aspect, in a first possible implementation manner of the second aspect, the switch device includes at least one device of a PMOSFET, an electromagnetic relay, a thyristor, a triode, or a controllable silicon element.

With reference to the second aspect or the first possible implementation manner of the second aspect, in a second possible implementation manner of the second aspect, the signal cable includes at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

According to a third aspect, an embodiment of the present disclosure provides a terminal device, including a charging input circuit, an apparatus for controlling a charging micro short circuit, a battery, and an application processor, where the charging input circuit charges the battery, the apparatus for controlling a charging micro short circuit is configured to determine whether a micro short circuit occurs on the charging input circuit, and send a signal to the application processor when the micro short circuit occurs on the charging input circuit such that the application processor controls an output device of the terminal device to emit an alert signal to prompt an owner of the terminal device that the micro short circuit occurs on the charging input circuit of the terminal device, and the apparatus for controlling a charging micro short circuit includes a voltage comparator and a processing unit, where the voltage comparator is configured to acquire a voltage of a power cable of the charging input circuit and a voltage of a signal cable of the charging input circuit, and obtain a difference between the voltage of the power cable of the charging input circuit and the voltage of the signal cable of the charging input circuit, and the processing unit is configured to determine, according to the difference between the voltage of the power cable of the charging input circuit and the voltage of the signal cable of the charging input circuit, whether a micro short circuit occurs on the charging input circuit, and in a case in which the micro short circuit occurs on the charging input circuit, send, to the application processor of the terminal device, a signal used to indicate that the micro short circuit occurs on the charging input circuit such that the application processor controls the output device of the terminal device to emit an alert signal to prompt the owner of the terminal device that the micro short circuit occurs on the charging input circuit of the terminal device.

With reference to the third aspect, in a first possible implementation manner of the third aspect, the terminal device further includes a charging control chip, and the charging control chip controls the charging input circuit to stop current input when the micro short circuit occurs on the charging input circuit.

With reference to the third aspect or the first possible implementation manner of the third aspect, in a second possible implementation manner of the third aspect, when the difference between the voltage of the power cable of the charging input circuit and the voltage of the signal cable of the charging input circuit is greater than a voltage threshold, and a time for which the difference between the voltage of the power cable of the charging input circuit and the voltage of the signal cable of the charging input circuit is greater than the voltage threshold is greater than a preset time threshold, the processing unit is further configured to determine that the micro short circuit occurs on the power cable of the charging input circuit, and send, to the application processor of the terminal device, a signal used to indicate that the micro short circuit occurs on the power cable of the charging input circuit such that the application processor controls the output device of the terminal device to emit an alert signal to prompt the owner of the terminal device that the micro short circuit occurs on the charging input circuit of the terminal device, where the voltage threshold is determined by the processing unit according to a wiring resistance of the power cable of the charging input circuit and a current that passes through the power cable of the charging input circuit, and the preset time threshold is greater than a designed communication signal period of the signal cable of the charging input circuit.

With reference to the third aspect or the first possible implementation manner of the third aspect, in a third possible implementation manner of the third aspect, when the difference between the voltage of the power cable of the charging input circuit and the voltage of the signal cable of the charging input circuit is less than 0 V, and a time for which the difference between the voltage of the power cable of the charging input circuit and the voltage of the signal cable of the charging input circuit is less than 0 V is greater than a preset time threshold, the processing unit is further configured to determine that the micro short circuit occurs on the signal cable of the charging input circuit, and send, to the application processor of the terminal device, a signal used to indicate that the micro short circuit occurs on the signal cable of the charging input circuit such that the application processor controls the output device of the terminal device to emit an alert signal to prompt the owner of the terminal device that the micro short circuit occurs on the charging input circuit of the terminal device, where the preset time threshold is greater than a designed communication signal period of the signal cable of the charging input circuit.

With reference to the third aspect or any possible implementation manner of the first possible implementation manner of the third aspect to the third possible implementation manner of the third aspect, in a fourth possible implementation manner of the third aspect, the apparatus for controlling a charging micro short circuit is a charging integrated circuit (IC) or a power management unit (PMU).

According to a fourth aspect, an embodiment of the present disclosure provides a charging system, including a charger and the terminal device according to the third aspect or any one of the first possible implementation manner of the third aspect to the fourth possible implementation manner of the third aspect, where the charger includes a charging interface, the charging interface includes a power cable, a ground cable, and a signal cable, and the power cable of the charging interface is connected to the signal cable of the charging interface using a resistor.

With reference to the fourth aspect, in a first possible implementation manner of the fourth aspect, a resistance value of the resistor is greater than or equal to 5 ohms.

According to a fifth aspect, an embodiment of the present disclosure provides a terminal device, including a charging input circuit, an apparatus for controlling a charging micro short circuit, a battery, and an application processor, where the charging input circuit charges the battery, the apparatus for controlling a charging micro short circuit is configured to determine whether a micro short circuit occurs on the charging input circuit, and in a case in which the micro short circuit occurs on the charging input circuit, send a signal to the application processor such that the application processor controls an output device of the terminal device to emit an alert signal to prompt an owner of the terminal device that the micro short circuit occurs on the charging input circuit of the terminal device, and the apparatus for controlling a charging micro short circuit includes a voltage comparator and a processing unit, where the voltage comparator is configured to acquire a voltage of a signal cable of the charging input circuit, and compare a reference voltage and the voltage of the signal cable of the charging input circuit, to obtain a difference between the voltage of the signal cable of the charging input circuit and the reference voltage, where the reference voltage is greater than 0 V and is less than a designed minimum output voltage value of a power cable of the charging input circuit, and the processing unit is configured to determine, according to the difference between the voltage of the signal cable of the charging input circuit and the reference voltage, whether a micro short circuit occurs on the signal cable of the charging input circuit, and in a case in which the micro short circuit occurs on the signal cable of the charging input circuit, send, to the application processor of the terminal device, a signal used to indicate that the micro short circuit occurs on the signal cable of the charging input circuit such that the application processor controls the output device of the terminal device to emit an alert signal to prompt the owner of the terminal device that the micro short circuit occurs on the charging input circuit of the terminal device.

With reference to the fifth aspect, in a first possible implementation manner of the fifth aspect, the terminal device further includes a charging control chip, and the charging control chip controls the charging input circuit to stop current input when the micro short circuit occurs on the signal cable of the charging input circuit.

With reference to the fifth aspect or the first possible implementation manner of the fifth aspect, in a second possible implementation manner of the fifth aspect, when the difference between the voltage of the signal cable of the charging input circuit and the reference voltage is greater than 0 V, and a time for which the difference between the voltage of the signal cable of the charging input circuit and the reference voltage is greater than 0 V is greater than a preset time threshold, the processing unit is further configured to determine that the micro short circuit occurs on the signal cable of the charging input circuit, and send, to the application processor of the terminal device, a signal used to indicate that the micro short circuit occurs on the signal cable of the charging input circuit such that the application processor controls the output device of the terminal device to emit an alert signal to prompt the owner of the terminal device that the micro short circuit occurs on the charging input circuit of the terminal device, where the preset time threshold is greater than a designed communication signal period of the signal cable of the charging input circuit.

With reference to the fifth aspect, the first possible implementation manner of the fifth aspect, or the second possible implementation manner of the fifth aspect, in a third possible implementation manner of the fifth aspect, the apparatus for controlling a charging micro short circuit is a charging IC or a PMU.

According to a sixth aspect, an embodiment of the present disclosure further provides a charging system, including a charger and the terminal device according to the fifth aspect or any possible implementation manner of the first possible implementation manner of the fifth aspect to the third possible implementation manner of the fifth aspect, where the charger includes a charging interface, the charging interface includes a power cable, a ground cable, and a signal cable, and the power cable of the charging interface is connected to the signal cable of the charging interface using a resistor.

With reference to the sixth aspect, in a first possible implementation manner of the sixth aspect, a resistance value of the resistor is greater than or equal to 5 ohms.

Based on the foregoing technical solutions, according to the charger, the terminal device, and the charging system provided in the embodiments of the present disclosure, a resistor is disposed between a power cable and a signal cable on a side of the charger, using a voltage drop generated on the signal cable because a micro short circuit occurs, a switch device is triggered to connect the power cable and a ground cable, and as a result, a secondary side of a transformer generates an overcurrent, and an overcurrent protection circuit detects the overcurrent and controls the charger to stop outputting a charging current to the terminal device, thereby controlling a charging process and improving charging security.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1A:
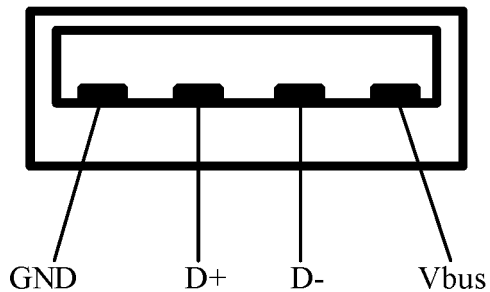
FIG. 1A is a schematic diagram of a USB interface.

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

For ease of understanding the embodiments of the present disclosure, several related concepts are described first herein.

(1) PWM

PWM is an analog control manner, and in PWM, an offset of a base of a transistor or a gate of a metal-oxide-semiconductor (MOS) transistor is modulated according to a change of corresponding load to implement a change of a time at which the transistor or the MOS transistor is conducted, and to implement a change of regulated power supply output of a switch. In this manner, an output voltage of power supply can maintain constant when a working condition changes, which is a very effective technology that controls an analog circuit using a digital signal of a microprocessor.

(2) MOSFET

A MOSFET is a switch device that is widely used, and the MOSFET has a relatively high switching speed but also has a relatively large parasitic capacitor. When the MOSFET is turned off, the parasitic capacitor of the MOSFET is fully charged under an effect of an external voltage, and if this part of charges is not discharged before the MOSFET is turned on, the charges are consumed inside the device.

The MOSFET may also be briefly referred to as a MOS transistor.

(3) PNP Transistor

The transistor is formed by sandwiching one N-type semiconductor between two P-type semiconductors, that is, N-electrons of two P-N junctions are connected to serve as a base, and the two P-type semiconductors separately serve as a collector and an emitter. A current flows in from the emitter, and an electric potential of the emitter is the highest and an electric potential of the collector is the lowest.

(4) Short Circuit

A short circuit refers to a case in which two points that have different electric potentials in a normal circuit are directly in contact incorrectly or are connected by a conductor having a very small impedance (or a resistance). A short circuit may be understood as a state in which two points that should not be connected in a normal circuit are connected because of a reason, that is, a low-impedance path is formed between two points that should not be connected. A short circuit represents a circuit connection status, and is unrelated to activities such as whether a voltage is applied and whether a loop is formed and a current is formed between two points of the short circuit. For example, a data cable D+ and a ground cable (GND) of a USB interface form a path because an object (liquid, metal, dust, or the like) enters, and it may be considered that a short circuit occurs between the data cable D+ and the GND, or it is briefly referred to as that a short circuit occurs on the data cable D+ (a short circuit to the ground), regardless of whether a power supply source is connected to two ends of the data cable D+ and the GND to form a loop. When a resistance of the entered object is relatively large, a current that may be caused by the short circuit from the data cable D+ to the ground is relatively small and is referred to as a micro short circuit.

Figure 1B:
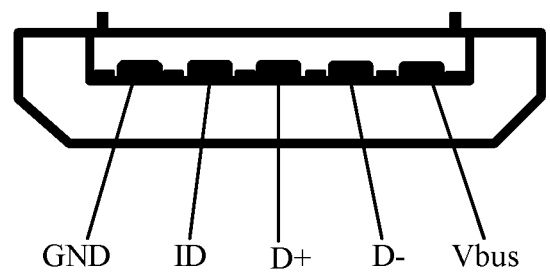
FIG. 1B is a schematic diagram of a Micro USB interface.

FIG. 1A and FIG. 1B are schematic diagrams of a USB interface and a Micro USB interface respectively. As shown in FIG. 1A, the USB interface generally includes a GND, a D+, a D−, and a power cable (Vbus). As shown in FIG. 1B, the Micro USB interface generally includes a GND, a D+, a D−, a Vbus, and a dead-end ID. Moreover, for a Micro USB interface of a Type C standard defined in a next-generation USB 3.1 specification, the Micro USB interface may further include another signal cable defined in the Type C interface.

A signal cable in this embodiment of the present disclosure includes a signal cable used to transmit a control signal and a signal cable used to transmit a data signal. For example, the signal cable may be at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

Because a USB interface and a Micro USB interface have a very compact structure currently, when a micro short circuit occurs on a stub of a charging circuit or a charging interface of a mobile terminal because liquid, metal, dust, or the like enters, in most cases, a micro short circuit to the ground also occurs on neighboring signal cables thereof because liquid enters.

Figure 2:
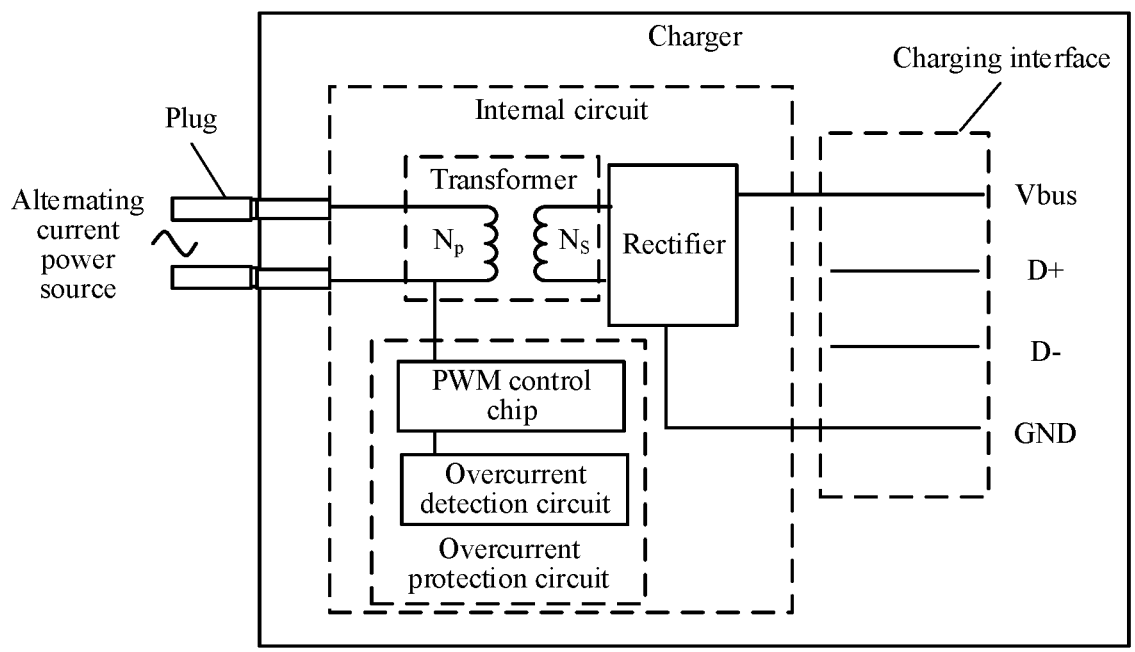
FIG. 2 is a schematic structural diagram of a charger.

FIG. 2 is a schematic structural diagram of a charger in other approaches. As shown in FIG. 2, the charger includes a plug, an internal circuit, and a charging interface. The charger is connected to an alternating current power source using the plug, converts an alternating current to a direct current using the internal circuit of the charger, and outputs the direct current using the charging interface. Corresponding to a USB interface, the charging interface of the charger generally also includes a GND, a D+, a D−, and a Vbus. The internal circuit includes a transformer, a rectifier, and an overcurrent protection circuit. An alternating current is input from a primary side $N_P$ of the transformer, and is induced to a secondary side $N_S$ of the transformer by the primary side $N_P$ of the transformer, and a direct current is output from the secondary side $N_S$ of the transformer after the alternating current is rectified by the rectifier. A positive electrode of the rectifier is connected to the Vbus, and a negative electrode of the rectifier is connected to the GND. The overcurrent protection circuit includes an overcurrent detection circuit and a PWM control chip, where the overcurrent detection circuit is configured to enable the PWM control chip to control the primary side $N_P$ of the transformer to stop inducing an alternating current to the secondary side $N_S$ of the transformer when it is detected that a current of the secondary side $N_S$ of the transformer is greater than or equal to a preset current threshold (an overcurrent). It should be understood that FIG. 2 shows only a schematic structure of the charger, and the structure of the charger may vary in various manners, which is not described in detail in the present disclosure.

Figure 3:
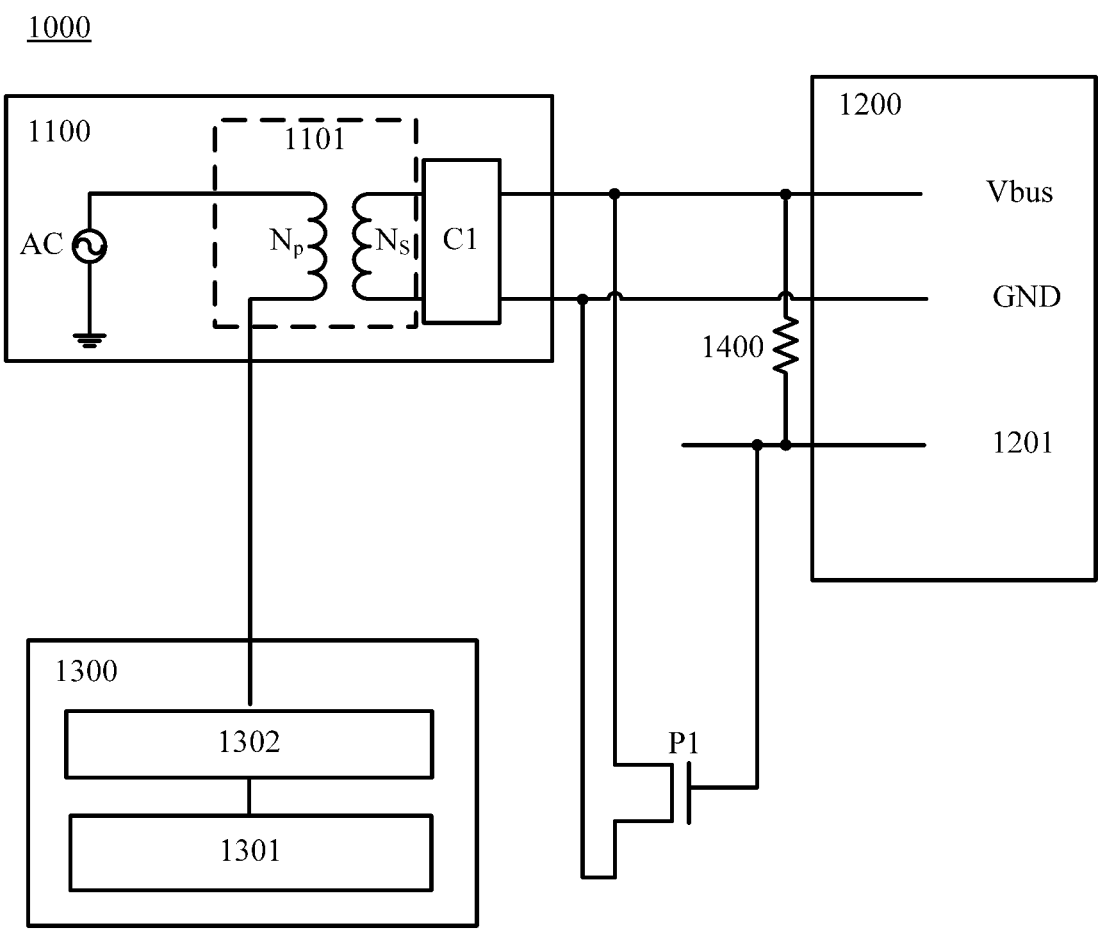
FIG. 3 is a schematic diagram of a circuit of a charger according to an embodiment of the present disclosure.

Based on the foregoing case, the charger may be improved, and FIG. 3 is a schematic diagram of a circuit of a charger 1000 according to an embodiment of the present disclosure. As shown in FIG. 3, the charger 1000 includes a power conversion circuit 1100, a charging interface 1200, and an overcurrent protection circuit 1300, where the power conversion circuit 1100 includes a transformer 1101 and a rectifier C1, an alternating current (designated as AC in FIG. 3) is input from a primary side $N_P$ of the transformer 1101, and is induced to a secondary side $N_S$ of the transformer 1101 by the primary side $N_P$ of the transformer 1101, and a direct current is output from the secondary side $N_S$ of the transformer 1101 after the alternating current is rectified by the rectifier C1.

The charging interface 1200 includes a Vbus, a GND, and a signal cable 1201, where a positive electrode of the rectifier C1 is connected to the Vbus, and a negative electrode of the rectifier C1 is connected to the GND.

The overcurrent protection circuit 1300 includes an overcurrent detection circuit 1301 and a PWM control chip 1302, the overcurrent detection circuit 1301 is configured to enable the PWM control chip 1302 to control the primary side $N_P$ of the transformer 1101 to stop inducing the alternating current to the secondary side $N_S$ of the transformer 1101 when it is detected that a current of the secondary side $N_S$ of the transformer 1101 is greater than or equal to a first current threshold that is preset, where the first current threshold is greater than a rated output current value of the charger 1000.

The charger 1000 further includes a resistor 1400 and a switch device P1.

A first end of the resistor 1400 is connected to the Vbus, and a second end of the resistor 1400 is connected to the signal cable 1201.

A first end of the switch device P1 is connected to the signal cable 1201, a second end of the switch device P1 is connected to the Vbus, a third end of the switch device P1 is connected to the GND, and in a case in which a difference between a voltage of the first end of the switch device P1 and a voltage of the second end of the switch device P1 is greater than or equal to a preset first voltage threshold, the second end of the switch device P1 and the third end of the switch device P1 are connected.

In a process in which the charger 1000 charges the terminal device, in a case in which the difference between the voltage of the first end of the switch device P1 and the voltage of the second end of the switch device P1 is greater than or equal to the first voltage threshold, the second end of the switch device P1 and the third end of the switch device P1 are connected such that the Vbus and the GND are connected. The current, detected by the overcurrent detection circuit 1301, of the secondary side $N_S$ of the transformer 1101 is greater than or equal to the first current threshold such that the PWM control chip 1302 controls the primary side $N_P$ of the transformer 1101 to stop inducing the AC to the secondary side $N_S$ of the transformer 1101, where the first voltage threshold is greater than 0 V and is less than an output voltage value of the Vbus.

Therefore, according to the charger 1000 provided in this embodiment of the present disclosure, a resistor 1400 is disposed between a power cable and a signal cable 1201, using a voltage drop generated on the signal cable 1201 because a micro short circuit occurs, a switch device is triggered to connect the power cable and a ground cable, and as a result, a secondary side of a transformer 1101 generates an overcurrent, and the overcurrent protection circuit 1300 detects the overcurrent and controls the charger to stop outputting a charging current to the terminal device, thereby controlling a charging process and improving charging security.

Further, the charger 1000 includes the power conversion circuit 1100, the charging interface 1200, and the overcurrent protection circuit 1300 shown in FIG. 3. The power conversion circuit 1100 generally includes the transformer 1101, and the transformer 1101 includes the primary side $N_P$ and the secondary side $N_S$. The primary side $N_P$ is connected to the AC power source, the secondary side $N_S$ is connected to the rectifier C1, and the positive electrode and the negative electrode of the rectifier C1 are connected to the Vbus and the GND of the charging interface 1200 respectively. It should be understood that the power conversion circuit 1100 may further include another auxiliary element, which is not limited in this embodiment of the present disclosure. When the charger 1000 works, an AC is input from the primary side $N_P$ of the transformer 1101, and is induced to the secondary side $N_S$ of the transformer 1101 by the primary side $N_P$ of the transformer 1101, and a direct current is output from the secondary side $N_S$ of the transformer 1101 after the AC is rectified by the rectifier C1. The direct current is output from the Vbus, and forms a charging loop with the GND by the charged terminal device.

An end of the primary side $N_P$ of the transformer 1101 of the charger 1000 is connected to the overcurrent protection circuit 1300. The overcurrent protection circuit 1300 includes the overcurrent detection circuit 1301 and the PWM control chip 1302. The overcurrent detection circuit 1301 includes an induction coil (not shown), used to feedback a sample such that the PWM control chip 1302 of the overcurrent protection circuit 1300 determines whether an overcurrent occurs. When detecting that an overcurrent occurs, the PWM control chip 1302 turns off the primary side $N_P$ of the transformer 1101, that is, turns off a path for inputting the AC, and in this case, the secondary side $N_S$ cannot generate an induced electromotive force, and the Vbus of the charger 1000 stops outputting a current. It should be understood that, circuits of an internal circuit of the charger 1000 may further include another device to implement a corresponding function of the other device, which is not limited in this embodiment of the present disclosure.

Generally, the charging interface 1200 further includes the signal cable 1201 in addition to the Vbus and the GND, and the signal cable 1201 may be, for example, a D+ or a D−. According to the charger 1000 in this embodiment of the present disclosure, the resistor 1400 is disposed between the signal cable 1201 and the Vbus of the charging interface 1200. For example, a D+ of the charger 1000 is pulled up to the Vbus using a resistor R.

In a case in which a USB interface has a very compact structure, generally, when a micro short circuit is generated on the signal cable 1201, a micro short circuit is also generated on the Vbus, and correspondingly, when a micro short circuit is generated on the Vbus, a micro short circuit is also generated on the signal cable 1201. In a case in which a micro short circuit occurs on a D+ at a Micro USB interface, if a resistance value R is set, the D+ generates a current to the ground. In a case in which the resistance value of the resistor R is sufficiently large, a voltage at the D+ experiences an obvious voltage drop relative to a charging voltage, and a logical low level is formed, where the logical low level may be used to control the primary side $N_P$ of the transformer 1101 of the power conversion circuit 1100 to be turned off to stop current output of the power conversion circuit 1100, thereby avoiding occurrence of the micro short circuit.

Further, the switch device P1 is disposed in the charger 1000, the first end of the switch device P1 is connected to the signal cable 1201, the second end of the switch device P1 is connected to the Vbus, and the third end of the switch device P1 is connected to the GND. A working principle of the switch device P1 is that when the difference between the voltage of the first end of the switch device P1 and the voltage of the second end of the switch device P1 is greater than or equal to the preset first voltage threshold, the second end of the switch device P1 and the third end of the switch device P1 are connected. The first voltage threshold should be greater than 0 V and is less than the output voltage value of the Vbus.

In a process in which the charger 1000 charges the terminal device, in a case in which the difference between the voltage of the first end of the switch device P1 (a voltage of the signal cable 1201) and the voltage of the second end of the switch device P1 (a voltage of the Vbus) is greater than or equal to the first voltage threshold, the second end of the switch device P1 and the third end of the switch device P1 are connected such that the Vbus and the GND are connected. The current, detected by the overcurrent detection circuit 1301, of the secondary side $N_S$ of the transformer 1101 is greater than or equal to the first current threshold such that the PWM control chip 1302 controls the primary side $N_P$ of the transformer 1101 to stop inducing the AC to the secondary side $N_S$ of the transformer 1101, where the first voltage threshold is greater than 0 V and is less than the output voltage value of the Vbus.

That is, in a process in which the charger 1000 charges the terminal device, in a case in which the difference between the voltage of the Vbus and the voltage of the signal cable 1201 is greater than or equal to the first voltage threshold, the switch device P1 connects the Vbus and the GND such that an excessively large current occurs between the Vbus and the GND to trigger overcurrent protection such that the PWM control chip 1302 turns off the primary side $N_P$ of the transformer 1101, and finally, the charger 1000 stops current output.

The resistance value of the resistor 1400 may be determined according to requirements. For example, the resistance value R is 1 kilo (K) ohms, and calculation is performed in a case in which an output voltage of the Vbus is generally 5 volts (V). When a D+ generates a micro short circuit current of over 3 milliamperes (mA), a voltage of the D+ is less than 2 V. 2 V may serve as a logical low level to trigger the switch device P1 to work to generate an overcurrent.

It should be understood that, in this embodiment of the present disclosure, a micro short circuit can be detected sensitively, and relative to the foregoing example, if a slighter micro short circuit needs to be detected, a resistor R having a larger resistance value may be selected such that a smaller micro short circuit current generates a sufficient voltage drop on R, and the signal cable 1201 is pulled down to a low level for detection and recognition by a terminal or the charger 1000. Therefore, the resistance value of the resistor R in this embodiment of the present disclosure should satisfy a voltage drop, generated by the resistor 1400, of a micro short circuit current is sufficiently large. When the micro short circuit occurs, a voltage of the signal cable 1201 may be enabled to enter a secure logical low level range (for example, a 5 V transistor-transistor logic (TTL) level and a 5 V complementary metal-oxide semiconductor (CMOS) level, where a secure low level range is lower than 0.4 V).

Generally, a typical micro short circuit current is around 0.5 amperes (A), and is generally greater than 0.2 A. In this way, a resistance value of a corresponding resistor is 22 ohms such that a micro short circuit current of 0.2 A generates a logical low level (which corresponds to a 4.4 V voltage drop). Therefore, in this embodiment of the present disclosure, preferably, a resistance value of a resistor is greater than or equal to 22 ohms.

It should be understood that the signal cable 1201 in this embodiment of the present disclosure may include at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

It should be understood that the switch device P1 may include at least one device of a PMOSFET, an electromagnetic relay, a thyristor, a triode, or a controllable silicon element. That is, the switch device P1 may be a single element or a combination of at least two elements described above.

It should be further understood that the first end of the switch device P1 may be directly connected to the signal cable 1201, or may be indirectly connected to the signal cable 1201. For example, another element may be connected between the first end of the switch device P1 and the signal cable 1201 to precisely control the voltage of the first end of the switch device P1.

Figure 4:
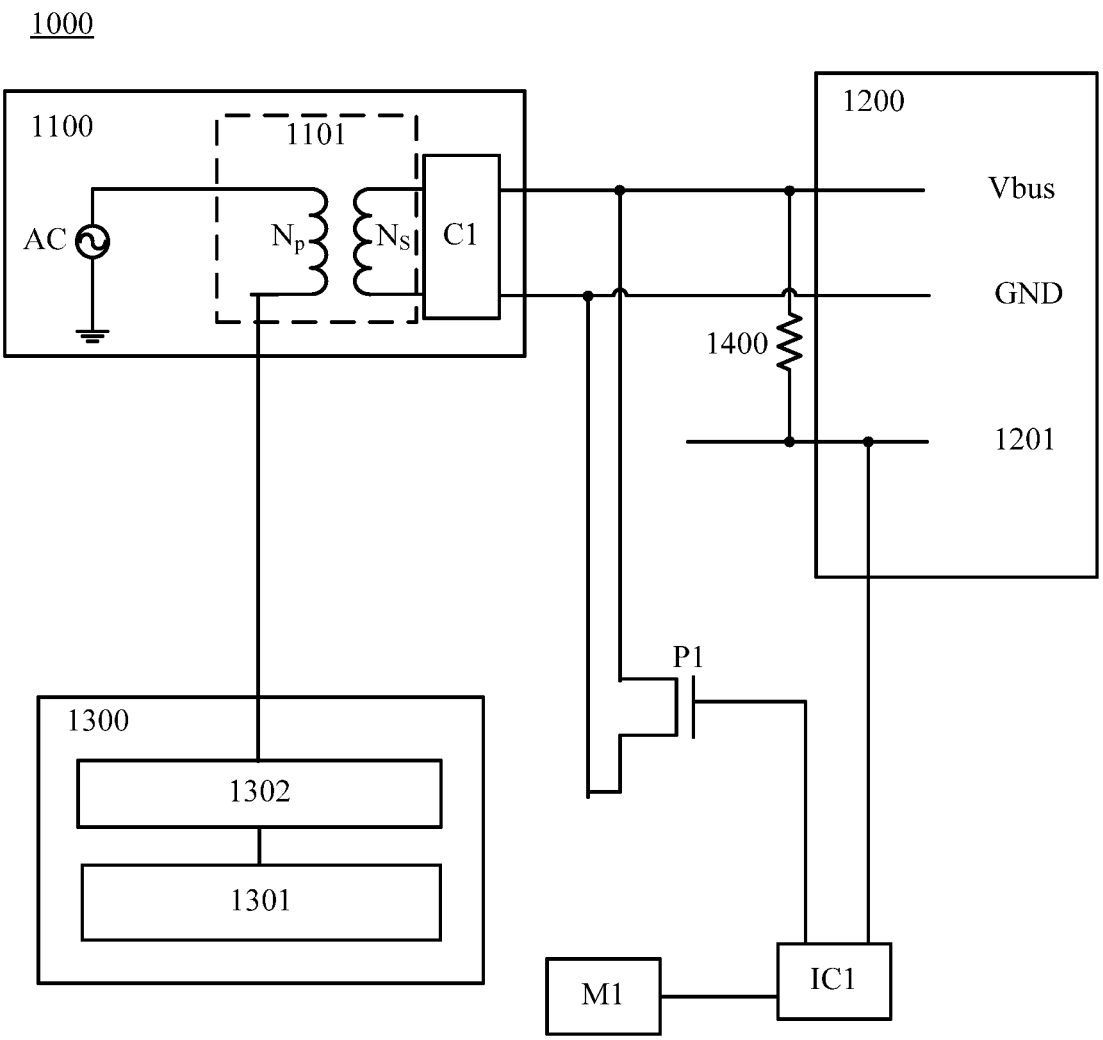
FIG. 4 is a schematic diagram of a circuit of a charger according to another embodiment of the present disclosure.

Optionally, in this embodiment of the present disclosure, as shown in FIG. 4, the charger 1000 may further include a voltage control chip IC1 and a power supply module M1 that supplies power to the voltage control chip IC1.

A first end of the voltage control chip IC1 is connected to the signal cable 1201, a second end of the voltage control chip IC1 is connected to the first end of the switch device P1, and a third end of the voltage control chip IC1 is connected to the power supply module M1. The voltage control chip IC1 is configured to output a low voltage at the second end of the voltage control chip IC1 when a voltage of the first end of the voltage control chip IC1 is less than or equal to a second voltage threshold such that the second end of the switch device P1 and the third end of the switch device P1 are connected, and the Vbus and the GND are connected. The current, detected by the overcurrent detection circuit 1301, of the secondary side of the transformer 1101 is greater than or equal to the first current threshold such that the PWM control chip 1302 controls the primary side $N_P$ of the transformer 1101 to stop inducing the AC to the secondary side $N_S$ of the transformer 1101, and the second voltage threshold is greater than 0 V and is less than a designed minimum output voltage value of the Vbus.

Further, as shown in FIG. 4, in the charger 1000 in this embodiment of the present disclosure, the signal cable 1201 of the charging interface 1200 may be, for example, a D+ or a D−, the resistor 1400 is disposed between the signal cable 1201 and the Vbus, the switch device P1 is disposed among the signal cable 1201 of the charging interface 1200, the Vbus of the charging interface 1200, and the GND of the charging interface 1200, and the voltage control chip IC1 is disposed between the signal cable 1201 and the first end of the switch device P1 to precisely control turning on and off of the switch device P1. The power supply module M1 may supply power to the voltage control chip IC1.

In a case in which a USB interface has a very compact structure, generally, when a micro short circuit is generated on the signal cable 1201, a micro short circuit is also generated on the Vbus, and correspondingly, when a micro short circuit is generated on the Vbus, a micro short circuit is also generated on the signal cable 1201. In a case in which a micro short circuit occurs on a D+ at a Micro USB interface, a resistor whose resistance value is R is set, and the D+ generates a current to the ground. In a case in which the resistance value of the resistor R is sufficiently large, a voltage at the D+ experiences an obvious voltage drop relative to a charging voltage, and a logical low level is formed. The low level is read by the first end of the voltage control chip IC1 (for example, an IN pin of IC1), and when a voltage of the signal cable 1201 is less than the second voltage threshold, the second end of the voltage control chip IC1 (for example, an OUT pin of IC1) is triggered to pull down the first end of the switch device P1 (for example, an emitter of a PMOSFET) such that the switch device P1 is turned on to trigger an overcurrent to occur between the Vbus and the GND, thereby stimulating the overcurrent protection circuit 1300 to perform overcurrent protection and the Vbus to stop current output.

It should be understood that the switch device P1 may include at least one device of a PMOSFET, an electromagnetic relay, a thyristor, a triode, or a controllable silicon element. That is, the switch device P1 may be a single element or a combination of at least two elements described above. The voltage control chip IC1 may be a chip that has a function of precisely determining an input voltage and outputting different control signals according to the input voltage. The power supply module M1 may be a sub-coil that is added beside an induction coil in the overcurrent protection circuit to supply power to the voltage control chip IC1, which is not limited in the present disclosure. In this embodiment of the present disclosure, precise control over a micro short circuit can be implemented.

Therefore, according to the charger provided in this embodiment of the present disclosure, a resistor is disposed between a power cable and a signal cable, using a voltage drop generated on the signal cable because a micro short circuit occurs, a switch device is triggered to connect the power cable and a ground cable, and as a result, a secondary side of a transformer generates an overcurrent, and an overcurrent protection circuit detects the overcurrent and controls the charger to stop outputting a charging current to the terminal device, thereby controlling a charging process and improving charging security.

Figure 5:
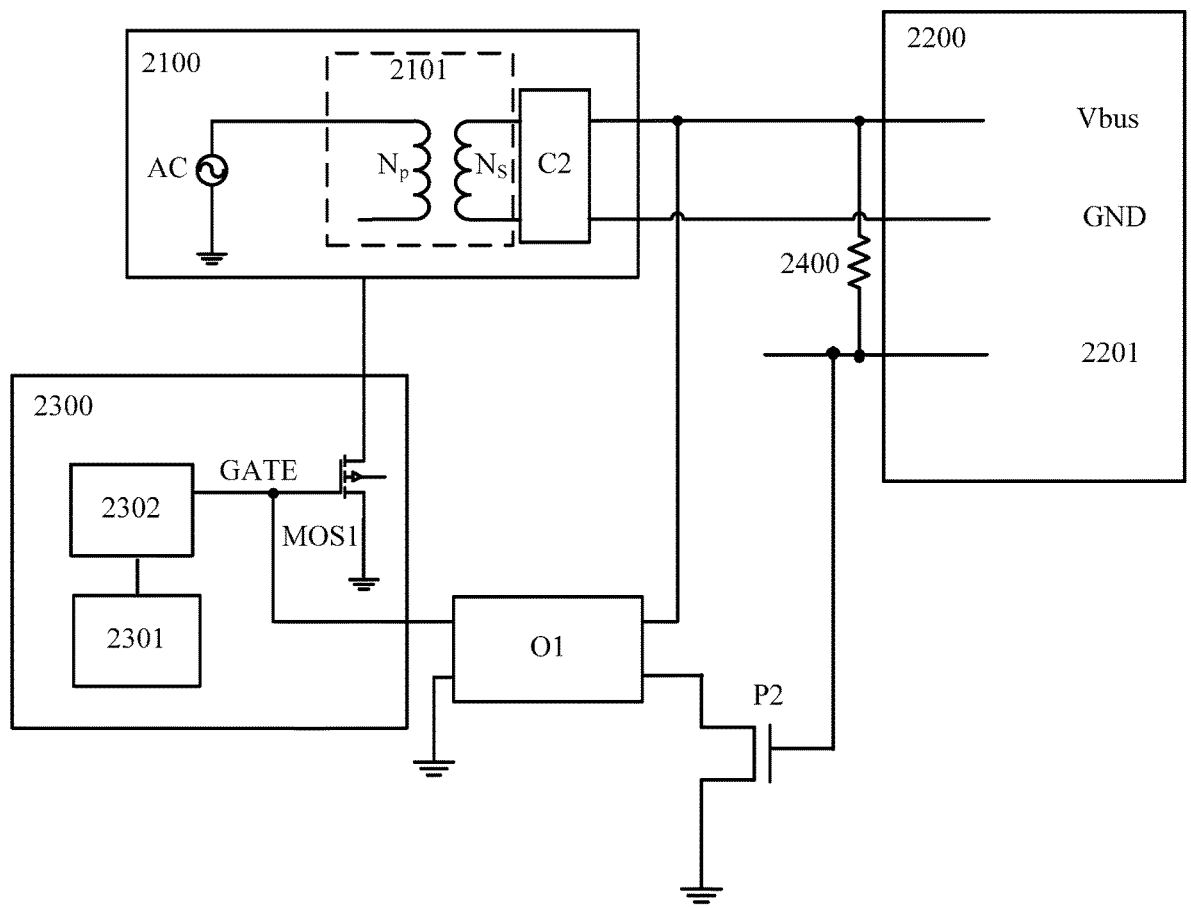
FIG. 5 is a schematic diagram of a circuit of a charger according to still another embodiment of the present disclosure.

FIG. 5 is a schematic diagram of a circuit of a charger 2000 according to an embodiment of the present disclosure. As shown in FIG. 5, the charger 2000 includes a power conversion circuit 2100, a charging interface 2200, and an overcurrent protection circuit 2300.

The power conversion circuit 2100 includes a transformer 2101 and a rectifier C2, an alternating current (designated as AC in FIG. 5) is input from a primary side $N_P$ of the transformer 2101, and is induced to a secondary side $N_S$ of the transformer 2101 by the primary side $N_P$ of the transformer 2101, and a direct current is output from the secondary side $N_S$ of the transformer 2101 after the AC is rectified by the rectifier C2.

The charging interface 2200 includes a Vbus, a GND, and a signal cable 2201, where a positive electrode of the rectifier C2 is connected to the Vbus, and a negative electrode of the rectifier C2 is connected to the GND.

The overcurrent protection circuit 2300 includes an overcurrent detection circuit 2301 and a PWM control chip 2302, where the overcurrent detection circuit 2301 is configured to enable the PWM control chip 2302 to control the primary side $N_P$ of the transformer 2101 to stop inducing the AC to the secondary side $N_S$ of the transformer 2101 when it is detected that a current of the secondary side $N_S$ of the transformer 2101 is greater than or equal to the first current threshold that is preset, where the first current threshold is greater than a rated output current value of the charger 2000.

The charger 2000 further includes a resistor 2400, a switch device P2, and an isolation control device O1.

A first end of the resistor 2400 is connected to the Vbus, and a second end of the resistor 2400 is connected to the signal cable 2201.

The overcurrent protection circuit 2300 further includes a MOSFET (MOS1), a first end of the MOS1 is connected to a control pin of the PWM control chip 2302, a second end of the MOS1 is connected to the primary side $N_P$ of the transformer 2101 to control working of the primary side $N_P$ of the transformer 2101. A third end of the MOS1 is grounded. In a case in which a voltage of the first end of the MOS1 is less than or equal to a third voltage threshold, the MOS1 is turned off such that the primary side $N_P$ of the transformer 2101 stops inducing the AC to the secondary side $N_S$ of the transformer 2101, where the third voltage threshold is greater than 0 V and is less than a working voltage of the PWM control chip 2302.

A first end of the switch device P2 is connected to the signal cable 2201, a second end of the switch device P2 is connected to a first input end of the isolation control device O1, a third end of the switch device P2 is connected to the ground. In a case in which a voltage difference between a voltage of the first end of the switch device P2 and a voltage of the second end of the switch device P2 is greater than or equal to a preset first voltage threshold, the switch device P2 is turned on to trigger the isolation control device O1 to work, where the first voltage threshold is greater than 0 V and is less than an output voltage value of the Vbus.

A second input end of the isolation control device O1 is connected to the Vbus, a first output end of the isolation control device O1 is connected to the control pin of the PWM control chip 2302, and a second output end of the isolation control device O1 is connected to the ground. When the switch device P2 is turned on, the isolation control device O1 is triggered to work such that a voltage of the first output end of the isolation control device O1 is less than the third voltage threshold.

Therefore, according to the charger 2000 provided in this embodiment of the present disclosure, the resistor 2400 is disposed between the power cable and the signal cable 2201, using a voltage drop generated on the signal cable 2201 because a micro short circuit occurs, the isolation control device is triggered to turn off the MOSFET that is in the overcurrent protection circuit and that controls working of the primary side of the transformer 2101, to control the charger 2000 to stop outputting a charging current to the terminal device, thereby controlling a charging process and improving charging security.

It should be understood that the isolation control device O1 may be a device such as an optical coupler or a magnetic coupler that has an isolation function. Preferably, the isolation control device O1 is an optical coupler, and descriptions are all provided below using an example in which the isolation control device O1 is an optical coupler.

Further, as shown in FIG. 5, in the charger 2000 in this embodiment of the present disclosure, the signal cable 2201 of the charging interface 2200 may be, for example, a D+ or a D−, the resistor 2400 is disposed between the signal cable 2201 and the Vbus, and the switch device P2 and an optical coupler O1 are disposed between the signal cable 2201 and the control pin GATE of the PWM control chip 2302 of the overcurrent protection circuit 2300.

In a case in which a USB interface has a very compact structure, generally, when a micro short circuit is generated on the signal cable 2201, a micro short circuit is also generated on the Vbus, and correspondingly, when a micro short circuit is generated on the Vbus, a micro short circuit is also generated on the signal cable 2201. For example, in a case in which a micro short circuit occurs on a D+ at a Micro USB interface, if a resistance value R is set, the D+ generates a current to the ground. In a case in which the resistance value of the resistor R is sufficiently large, a voltage at the D+ experiences an obvious voltage drop relative to a charging voltage, and a logical low level is formed. A difference between a voltage of the Vbus and the logical low level triggers the switch device P2 such that the switch device P2 is turned on, a current is generated between a first input end and a second input end of the optical coupler O1, and a first output end of the optical coupler O1 enables a voltage of the control pin GATE of the PWM control chip 2302 to be pulled down to become a low voltage, where the low voltage is less than the third voltage threshold, and the third voltage threshold is greater than 0 V and is less than the working voltage of the PWM control chip 2302. The low voltage of the GATE enables the MOS1 to be turned off such that the primary side $N_P$ of the transformer 2101 of the power conversion circuit 2100 stops working, the secondary side $N_S$ of the transformer 2101 cannot generate an induced current, and the Vbus stops current output.

It should be understood that, in this embodiment of the present disclosure, an isolation control function of the optical coupler O1 is used to conduct a level signal of the signal cable 2201 to a side of the overcurrent protection circuit 2300 of the charger 2000, and when a micro short circuit occurs on the signal cable 2201 and a level of the signal cable 2201 decreases, a coil of the primary side of the transformer 2101 directly stops working, and the Vbus stops current output. The micro short circuit can be precisely controlled by selecting an optical coupler O1 of a suitable specification. The optical coupler O1 may also be an isolator having a similar function, and an output of the isolator to the primary side $N_P$ of the transformer 2101 is transferred to a control pin of the PWM control chip 2302 such that the primary side $N_P$ of the transformer 2101 stops working.

It should be understood that the switch device P2 may include at least one device of a PMOSFET, an electromagnetic relay, a thyristor, a triode, or a controllable silicon element. That is, the switch device P2 may be a single element or a combination of at least two elements described above. Preferably, the switch device P2 is a PNP transistor.

It should be understood that the signal cable 2201 in this embodiment of the present disclosure may include at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

Therefore, according to the charger 2000 provided in this embodiment of the present disclosure, the resistor 2400 is disposed between the Vbus and a signal cable 2201, using a voltage drop generated on the signal cable 2201 because a micro short circuit occurs, the isolation control device O1 is triggered to turn off a MOSFET (the MOS1) that is in the overcurrent protection circuit 2301 and that controls working of the primary side $N_P$ of the transformer 2101 to control the charger 2000 to stop outputting a charging current to a terminal device, thereby controlling a charging process and improving charging security.

Figure 6:
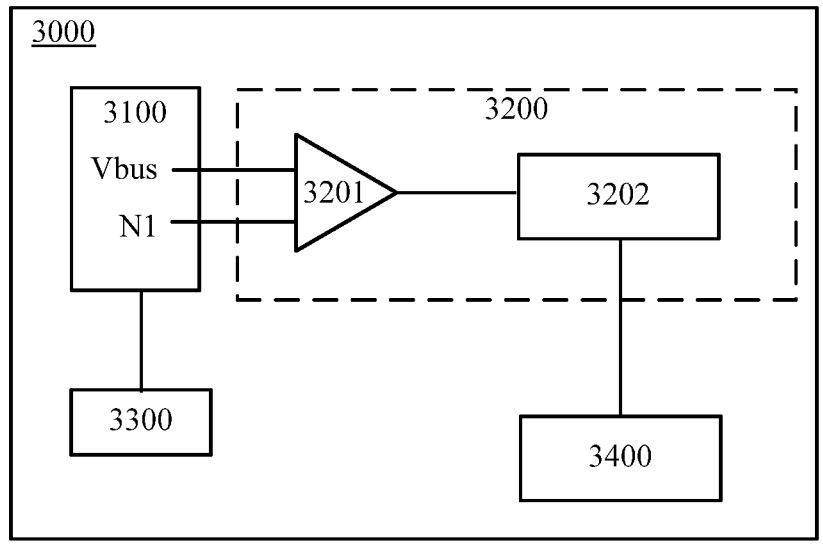
FIG. 6 is a schematic structural diagram of a circuit of a terminal device according to an embodiment of the present disclosure.

An embodiment of the present disclosure further provides an improved terminal device. FIG. 6 is a schematic diagram of a circuit of a terminal device 3000 according to an embodiment of the present disclosure. As shown in FIG. 6, the terminal device 3000 includes a charging input circuit 3100, an apparatus 3200 for controlling a charging micro short circuit, a battery 3300, and an application processor 3400.

The charging input circuit 3100 charges the battery 3300. The apparatus 3200 for controlling a charging micro short circuit is configured to determine whether a micro short circuit occurs on the charging input circuit 3100, and sends a signal to the application processor 3400 when the micro short circuit occurs on the charging input circuit 3100 such that the application processor 3400 controls an output device of the terminal device 3000 to emit an alert signal to prompt an owner of the terminal device 3000 that the micro short circuit occurs on the charging input circuit 3100 of the terminal device 3000.

The apparatus 3200 for controlling a charging micro short circuit includes a voltage comparator 3201 and a processing unit 3202.

The voltage comparator 3201 is configured to acquire a voltage of a Vbus of the charging input circuit 3100 and a voltage of a signal cable N1 of the charging input circuit 3100, and obtain a difference between the voltage of the Vbus of the charging input circuit 3100 and the voltage of the signal cable N1 of the charging input circuit 3100.

The processing unit 3202 is configured to determine, according to the difference between the voltage of the Vbus of the charging input circuit 3100 and the voltage of the signal cable N1 of the charging input circuit 3100, whether a micro short circuit occurs on the charging input circuit 3100, and send, to the application processor 3400 of the terminal device 3000, a signal used to indicate that the micro short circuit occurs on the charging input circuit 3100 when the micro short circuit occurs on the charging input circuit 3100 such that the application processor 3400 controls the output device of the terminal device 3000 to emit an alert signal to prompt the owner of the terminal device 3000 that the micro short circuit occurs on the charging input circuit 3100 of the terminal device 3000.

Further, in a case in which a micro short circuit occurs on the Vbus of the charging input circuit 3100 because liquid, metal dust, or the like enters a charging interface and a stub of the charging input circuit 3100 on a side of a charger or a charging interface on a side of the terminal device 3000, a power cable of the charging interface of the charger may be connected to a signal cable of the charging interface of the charger using a resistor.

In a circuit that includes the charger and the terminal device 3000, in a case in which no short circuit occurs on the signal cable, the power cable of the charging interface of the charger is connected to the signal cable of the charging interface of the charger using a resistor, and a voltage of the power cable of an internal circuit of the charger may be obtained by collecting a voltage of the signal cable of the internal circuit of the charger. Because the voltage of the power cable of the charger may be collected on the side of the charger using the signal cable, and the voltage of the signal cable of the internal circuit of the charger is equal to the voltage of the signal cable N1 of the charging input circuit 3100 of the terminal device 3000, the voltage of the power cable of the internal circuit of the charger may be obtained by collecting the voltage of the signal cable N1 of the charging input circuit 3100 of the terminal device 3000. On the side of the charged terminal device 3000, the voltage of the signal cable N1 of the charging input circuit 3100 is sampled, and is compared with a voltage of the Vbus of the charging input circuit 3100 to determine whether a voltage drop from the side of the charger to the side of the terminal device 3000 exceeds a proper range, which is used as a basis for determining whether a micro short circuit occurs on the Vbus.

In a circuit that includes the charger and the terminal device 3000, in a case in which a short circuit occurs on the signal cable, the power cable of the charging interface of the charger is connected to the signal cable of the charging interface of the charger using a resistor whose resistance value is R. Because the resistor whose resistance value is R is disposed between the power cable of the charging interface of the charger and the signal cable of the charging interface of the charger, a current to the ground is generated on the signal cable. In a case in which the resistance value R of the resistor is sufficiently large, the voltage of the signal cable N1 of the charging input circuit 3100 of the terminal device 3000 experiences an obvious voltage drop relative to a charging voltage, and it may be determined, according to the voltage drop, that a micro short circuit occurs on the signal cable N1 of the charging input circuit 3100.

Therefore, according to the terminal device 3000 provided in this embodiment of the present disclosure, the difference between the voltage of the Vbus of the charging input circuit 3100 and the voltage of the signal cable N1 of the charging input circuit 3100 is obtained through comparison such that it may be determined whether a micro short circuit occurs on the charging input circuit 3100. When the micro short circuit occurs on the charging input circuit 3100, an alert signal used to indicate that the micro short circuit occurs on the charging input circuit 3100 is sent such that the owner of the terminal device 3000 is prompted that the micro short circuit occurs on the charging input circuit 3100 of the terminal device 3000, which can improve charging security.

The apparatus 3200 for controlling a charging micro short circuit in this embodiment of the present disclosure may be a charging IC or a PMU of the terminal device 3000. The voltage comparator 3201 of the apparatus 3200 for controlling a charging micro short circuit compares the voltage of the signal cable N1 of the charging input circuit 3100 and the voltage of the Vbus of the charging input circuit 3100. The processing unit 3202 determines, according to the difference between the voltages, whether the micro short circuit occurs on the charging input circuit 3100. When the micro short circuit occurs on the charging input circuit 3100, the processing unit 3202 sends to the application processor 3400 of the terminal device 3000, a signal used to indicate that the micro short circuit occurs on the charging input circuit 3100 such that the application processor 3400 controls the output device of the terminal device 3000 to emit an alert signal.

The alert signal may be a sound signal emitted by a horn of the terminal device 3000, may be an optical signal emitted by a screen, an indicator, a flash, or the like, or may be a vibration signal emitted by a vibration apparatus in the terminal device 3000, which is not limited in this embodiment of the present disclosure. The terminal device 3000 emits the alert signal such as sound and light to notify a user of an exception of a charging micro short circuit, and may further prompt the user to clean a Micro USB interface, replace a charging cable, or the like.

Optionally, in an embodiment, when the difference between the voltage of the Vbus of the charging input circuit 3100 and the voltage of the signal cable N1 of the charging input circuit 3100 is greater than a voltage threshold, and a time for which the difference between the voltage of the Vbus of the charging input circuit 3100 and the voltage of the signal cable N1 of the charging input circuit 3100 is greater than the voltage threshold is greater than a preset time threshold, the processing unit 3202 is further configured to determine that the micro short circuit occurs on the Vbus of the charging input circuit 3100, and sends, to the application processor 3400 of the terminal device 3000, a signal used to indicate that the micro short circuit occurs on the Vbus of the charging input circuit 3100 such that the application processor 3400 controls the output device of the terminal device 3000 to emit an alert signal to prompt the owner of the terminal device 3000 that the micro short circuit occurs on the charging input circuit 3100 of the terminal device 3000.

The voltage threshold is determined by the processing unit 3202 according to a wiring resistance of the Vbus of the charging input circuit 3100 and a current that passes through the Vbus of the charging input circuit 3100, and the preset time threshold is greater than a designed communication signal period of the signal cable N1 of the charging input circuit 3100.

Further, according to a specific specification of a charger, a maximum allowable voltage drop of the Vbus from the charger to the Micro USB interface of the terminal device 3000 is generally 200 millivolts (mV). When no micro short circuit occurs on a signal cable, for a data cable such as D+/D−, because there is no current consumption, there is almost no voltage drop from a signal cable of a charging interface of the charger to the signal cable N1 of the charging input circuit 3100 of the terminal device 3000. That is, in a case in which no micro short circuit occurs at either the charging interface of the charger or the Vbus and the signal cable N1 of the charging input circuit 3100 of the terminal device 3000, the difference between the voltage of the Vbus of the charging input circuit 3100 of the terminal device 3000 and the voltage of the signal cable N1 of the charging input circuit 3100 of the terminal device 3000 should not be greater than 200 mV.

In a specific example, when the difference, which is collected by the voltage comparator 3201, between the voltage of the Vbus of the charging input circuit 3100 and the voltage of the signal cable N1 of the charging input circuit 3100 is greater than 200 mV, and the time for which the difference is steadily greater than 200 mV is greater than the preset time threshold, it is considered that the micro short circuit occurs on the Vbus of the charging input circuit 3100. The preset time threshold should be greater than the designed communication signal period of the signal cable N1 of the charging input circuit 3100, and may be several seconds or longer such that the preset time threshold is sufficiently longer than a signal period of the signal cable N1 during normal communication to avoid that when the terminal device 3000 is inserted into a USB interface of another terminal device (for example, a desktop computer) to communicate with the other terminal device, a shift that occurs when D+/D− or the like transfers a digital signal causes incorrect determining.

Optionally, in an embodiment, when the difference between the voltage of the Vbus of the charging input circuit 3100 and the voltage of the signal cable N1 of the charging input circuit 3100 is less than 0 V, and a time for which the difference between the voltage of the Vbus of the charging input circuit 3100 and the voltage of the signal cable N1 of the charging input circuit 3100 is less than 0 V is greater than a preset time threshold, the processing unit 3202 is further configured to determine that the micro short circuit occurs on the signal cable N1 of the charging input circuit 3100, and send, to the application processor 3400 of the terminal device 3000, a signal used to indicate that the micro short circuit occurs on the signal cable N1 of the charging input circuit 3100 such that the application processor 3400 controls the output device of the terminal device 3000 to emit an alert signal to prompt the owner of the terminal device 3000 that the micro short circuit occurs on the charging input circuit 3100 of the terminal device 3000.

The preset time threshold is greater than a designed communication signal period of the signal cable N1 of the charging input circuit 3100.

Further, in a case in which a micro short circuit occurs on the signal cable N1 of the charging input circuit 3100, a resistor whose resistance value is R is disposed between the power cable of the charging interface of the charger and the signal cable of the charging interface of the charger. Because the short circuit occurs on the signal cable N1, a current to the ground is generated on the signal cable N1, and in a case in which the resistance value R of the resistor is sufficiently large, the voltage of the signal cable N1 of the charging input circuit 3100 experiences an obvious voltage drop relative to a charging voltage such that the voltage of the signal cable N1 of the charging input circuit 3100 is less than the voltage of the Vbus of the charging input circuit 3100, that is, the difference between the voltage of the Vbus of the charging input circuit 3100 and the voltage of the signal cable N1 of the charging input circuit 3100 is less than 0.

In a specific example, when the difference, which is collected by the voltage comparator 3201, between the voltage of the Vbus of the charging input circuit 3100 and the voltage of the signal cable N1 of the charging input circuit 3100 is less than 0, and the time for which the difference is steadily greater than 200 mV is greater than the preset time threshold, it is considered that the micro short circuit occurs on the signal cable N1 of the charging input circuit 3100. The preset time threshold should be greater than the designed communication signal period of the signal cable N1 of the charging input circuit 3100, and may be several seconds or longer such that the preset time threshold is sufficiently longer than a signal period of the signal cable N1 during normal communication to avoid that when the terminal device is inserted into a USB interface of another terminal device (for example, a desktop computer) to communicate with the other terminal device, a shift that occurs when D+/D− or the like transfers a digital signal causes incorrect determining.

When the difference between the voltage of the Vbus of the charging input circuit 3100 and the voltage of the signal cable N1 of the charging input circuit 3100 is greater than 0 and is less than a voltage threshold, it is determined that normal charging is performed currently. For example, when a difference between a voltage of the Vbus and a voltage of a data cable D−/D+ is greater than 0 and is less than 200 mV, it is determined that normal charging is performed currently. When the voltage of the data cable D−/D+ is always 0 V, it is considered that a used charger may be a charger of a non-standard configuration, and the application processor 3400 of the terminal device 3000 may be triggered to prompt that the charger is not a dedicated charger, and stop a charging action.

Optionally, in this embodiment of the present disclosure, the signal cable N1 of the charging input circuit 3100 may include at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

Optionally, in an embodiment, the terminal device 3000 further includes a charging control chip (not shown).

In a case in which the micro short circuit occurs on the charging input circuit 3100, the charging control chip controls the charging input circuit 3100 to stop current input. In this way, not only the alert signal is emitted for the owner of the terminal device 3000, but also a current charging process is interrupted, which can further improve charging process security.

Optionally, in this embodiment of the present disclosure, the voltage threshold is determined by the processing unit 3202 according to a wiring resistance of the Vbus of the charging input circuit 3100 and a current that passes through the Vbus of the charging input circuit 3100. In addition, the voltage threshold may also be preset according to an empirical value.

When no micro short circuit exists on the signal cable N1 of the charging input circuit 3100, the wiring resistance of the Vbus of the charging input circuit 3100 may be calculated using the following method.

The terminal device 3000 further includes a charging control chip (not shown) and a storage unit (not shown), where the charging control chip is configured to control a charging current value, the charging control chip is in communication connection with the processing unit 3202, and the storage unit is in communication connection with the processing unit 3202.

The processing unit 3202 is further configured to acquire a first charging current value using the charging control chip, and acquire, using the voltage comparator 3201, a first difference between the voltage of the Vbus of the charging input circuit 3100 and the voltage of the signal cable N1 of the charging input circuit 3100, acquire a second charging current value using the charging control chip, acquire a second difference between the voltage of the Vbus of the charging input circuit 3100 and the voltage of the signal cable N1 of the charging input circuit 3100 using the voltage comparator 3201, and determine the wiring resistance of the Vbus of the charging input circuit 3100 according to the first charging current value, the second charging current value, the first difference, and the second difference, and during charging, acquire a current third charging current value using the charging control chip, acquire, using the voltage comparator 3201, a current third difference between the voltage of the Vbus of the charging input circuit 3100 and the voltage of the signal cable N1 of the charging input circuit 3100, and determine, according to the third charging current value and the wiring resistance, a proper difference between the Vbus of the charging input circuit 3100 and the signal cable N1 of the charging input circuit 3100.

The storage unit is configured to store the wiring resistance.

Further, the charging control chip has a function of controlling a charging current value. The processing unit 3202 has a logical operation capability to some extent, and has a function similar to a single-chip microcomputer (such as a Micro Control Unit (MCU)) or a thin central processing unit (CPU). Detection logic is as follows.

When a new terminal device is powered on, generally, no micro short circuit exists, in this case:

1) During initial charging, a relatively large current is used for charging, and the processing unit 3202 reads a current first charging current value $I_1$ from the charging control chip, and reads, from the voltage comparator 3201, a first difference between the voltage of the Vbus of the charging input circuit 3100 and the voltage of the signal cable N1 (for example, a data cable D+/D−) of the charging input circuit 3100. Because the Vbus of the charging input circuit 3100 has a voltage drop caused by a wiring resistance and a contact resistance in a case of the large current, the processing unit 3202 obtains by reading that the voltage of the signal cable N1 of the charging input circuit 3100 is greater than the voltage of the Vbus of the charging input circuit 3100 by a.

2) The processing unit 3202 sends a command to the charging control chip to request the charging control chip to decrease or increase a charging current at a particular moment. Assuming that a charging current decreases by $\Delta I$, the processing unit 3202 reads a current second charging current value $I_2$ from the charging control chip, where $\Delta I = I_1 - I_2$, and reads, from the voltage comparator 3201, a second difference between the voltage of the Vbus of the charging input circuit 3100 and the voltage of the signal cable N1 (for example, a data cable D+/D−) of the charging input circuit 3100. Because the Vbus of the charging input circuit 3100 has a voltage drop caused by a wiring resistance and a contact resistance in a case of the large current, the voltage of the signal cable N1 of the charging input circuit 3100 is greater than the voltage of the Vbus of the charging input circuit 3100 by b. Because a current transferred by the Vbus of the charging input circuit 3100 to the charging control chip decreases, the numerical value b is less than a.

3) The processing unit 3202 may calculate the wiring resistance R of the Vbus of the charging input circuit 3100 according to the first charging current value $I_1$, the second charging current value $I_2$, the first difference a, and the second difference b:

$$R=(a-b)/(I_1-I_2)=(a-b)/\Delta I.$$

4) The storage unit records the wiring resistance R of the Vbus of the charging input circuit 3100.

At any moment during subsequent charging:

1) The processing unit 3202 may acquire a current third charging current value $I_3$ using the charging control chip, and the wiring resistance R of the Vbus of the charging input circuit 3100 that is recorded in the storage unit, and calculate a proper difference $\Delta V = R \times I_3$ between the voltage of the Vbus of the charging input circuit 3100 and the voltage of the signal cable N1 of the charging input circuit 3100.

2) The processing unit 3202 acquires, using the voltage comparator 3201, a current third difference c between the voltage of the Vbus of the charging input circuit 3100 and the voltage of the signal cable N1 of the charging input circuit 3100.

3) The processing unit 3202 determines, according to a result of comparing the proper difference $\Delta V$ with the third difference c, whether a micro short circuit occurs on the Vbus of the charging input circuit 3100.

In this embodiment of the present disclosure, the wiring resistance R of the Vbus of the charging input circuit 3100 is actually calculated. Therefore, a voltage threshold can be set more accurately, and it can be determined more accurately whether a micro short circuit occurs on the charging input circuit 3100.

Therefore, according to the terminal device 3000 provided in this embodiment of the present disclosure, the difference between the voltage of the Vbus of the charging input circuit 3100 and the voltage of the signal cable N1 of the charging input circuit 3100 is obtained through comparison such that it may be determined whether a micro short circuit occurs on the charging input circuit 3100. When the micro short circuit occurs on the charging input circuit 3100, an alert signal used to indicate that the micro short circuit occurs on the charging input circuit 3100 is sent such that the owner of the terminal device 3000 is prompted that the micro short circuit occurs on the charging input circuit 3100 of the terminal device 3000, which can improve charging security.

An embodiment of the present disclosure further provides a charging system, including a charger and the terminal device 3000 described in the foregoing embodiment. The charger includes a charging interface, the charging interface includes a power cable, a ground cable, and a signal cable, and the power cable of the charging interface is connected to the signal cable of the charging interface using a resistor.

It should be understood that, in this embodiment of the present disclosure, a resistance value of the resistor should satisfy a voltage drop, generated by the resistor, of a micro short circuit current of the signal cable is sufficiently large, and when a micro short circuit occurs, a voltage of the signal cable may be less than a designed minimum output voltage of the Vbus. For example, a designed output voltage range of the Vbus is 4.5 V to 5.5 V. In this case, when an output voltage of the Vbus is 5.5 V, a voltage drop greater than 1 V should be generated when the micro short circuit current passes through the resistor such that the voltage of the signal cable is less than the designed minimum voltage 4.5 V of the Vbus, and the voltage comparator may determine that a micro short circuit occurs.

Generally, a typical micro short circuit current is around 0.5 A, and is generally greater than 0.2 A. In this way, a resistance value of a corresponding resistor should be typically around 2 ohms such that a 0.2 A micro short circuit generates a sufficient voltage drop. When a resistance value is larger, a 0.5 V voltage drop is generated and identified more easily, and precision is improved. Therefore, preferably, the resistance value of the resistor is greater than or equal to 5 ohms.

Moreover, the power cable of the charging interface of the charger may also be directly connected to the signal cable of the charging interface of the charger using a conductor. Similarly, in a case in which no micro short circuit occurs on the signal cable N1 of the charging input circuit 3100, the foregoing method for determining whether the difference between the voltage of the Vbus of the charging input circuit 3100 and the voltage of the signal cable N1 of the charging input circuit 3100 is greater than a voltage threshold may also be used to determine whether a micro short circuit occurs on the Vbus of the charging input circuit 3100.

Figure 7:
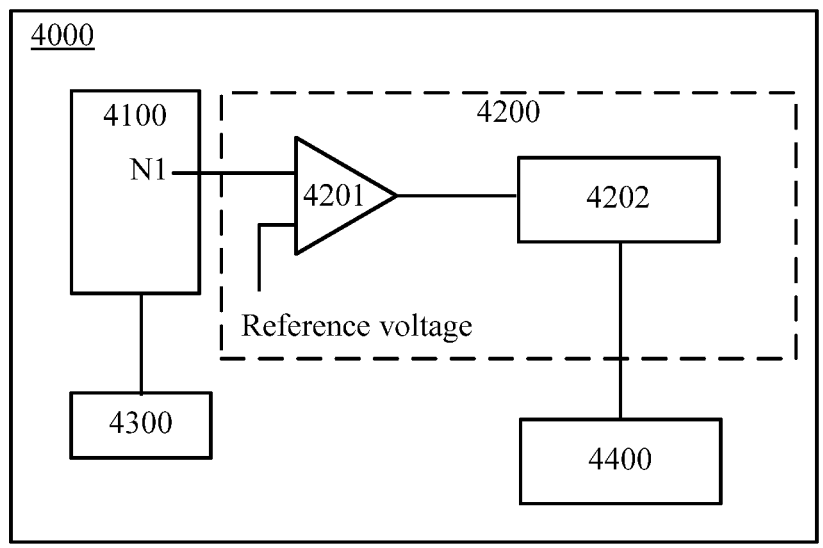
FIG. 7 is a schematic structural diagram of a circuit of a terminal device according to another embodiment of the present disclosure.

An embodiment of the present disclosure further provides a terminal device applicable to a case in which a micro short circuit occurs on a signal cable of a charging input circuit. FIG. 7 is a schematic diagram of a circuit of a terminal device 4000 according to an embodiment of the present disclosure. The terminal device 4000 includes a charging input circuit 4100, an apparatus 4200 for controlling a charging micro short circuit, a battery 4300, and an application processor 4400.

The charging input circuit 4100 charges the battery 4300. The apparatus 4200 for controlling a charging micro short circuit is configured to determine whether a micro short circuit occurs on the charging input circuit 4100, and send a signal to the application processor 4400 when the micro short circuit occurs on the charging input circuit 4100 such that the application processor 4400 controls an output device of the terminal device 4000 to emit an alert signal to prompt an owner of the terminal device 4000 that the micro short circuit occurs on the charging input circuit 4100 of the terminal device 4000.

The apparatus 4200 for controlling a charging micro short circuit includes a voltage comparator 4201 and a processing unit 4202.

The voltage comparator 4201 is configured to acquire a voltage of a signal cable N1 of the charging input circuit 4100, and compare a reference voltage with the voltage of the signal cable N1 of the charging input circuit 4100 to obtain a difference between the voltage of the signal cable N1 of the charging input circuit 4100 and the reference voltage, where the reference voltage is greater than 0 V and is less than a designed minimum output voltage value of a Vbus of the charging input circuit 4100.

The processing unit 4202 is configured to determine, according to the difference between the voltage of the signal cable N1 of the charging input circuit 4100 and the reference voltage, whether a micro short circuit occurs on the signal cable N1 of the charging input circuit 4100, and when the micro short circuit occurs on the signal cable N1 of the charging input circuit 4100, send, to the application processor 4400 of the terminal device 4000, a signal used to indicate that the micro short circuit occurs on the signal cable N1 of the charging input circuit 4100 such that the application processor 4400 controls the output device of the terminal device 4000 to emit an alert signal to prompt the owner of the terminal device 4000 that the micro short circuit occurs on the charging input circuit 4100 of the terminal device 4000.

Therefore, according to the terminal device 4000 provided in this embodiment of the present disclosure, the difference between the voltage of the signal cable N1 of the charging input circuit 4100 and the reference voltage is compared such that it may be determined whether a micro short circuit occurs on a circuit on which the signal cable N1 of the charging input circuit 4100 is located. When the micro short circuit occurs on the circuit on which the signal cable N1 of the charging input circuit 4100 is located, an alert signal used to indicate that the micro short circuit occurs on the charging input circuit is sent such that the owner of the terminal device 4000 is prompted that the micro short circuit occurs on the charging input circuit 4100 of the terminal device 4000, which can improve charging security.

Further, because a USB interface has a very compact structure, generally, when a micro short circuit is generated on the signal cable N1 of the charging input circuit 4100, a micro short circuit is also generated on the Vbus of the charging input circuit 4100, and correspondingly, when a micro short circuit is generated on the Vbus of the charging input circuit 4100, a micro short circuit is also generated on the signal cable N1 of the charging input circuit 4100. Therefore, in a case in which a micro short circuit occurs on the signal cable N1 of the charging input circuit 4100, a resistor whose resistance value is R is disposed between a power cable and a signal cable of a charging interface of a charger. Because of the short circuit of the signal cable, a current to the ground is generated on the resistor, and in a case in which the resistance value R of the resistor is sufficiently large, the voltage of the signal cable experiences an obvious voltage drop relative to a charging voltage. The voltage of the signal cable is collected at the charging input circuit 4100 of the terminal device 4000, and is compared with the reference voltage, and it is determined, according to the difference between the voltage of the signal cable N1 of the charging input circuit 4100 and the reference voltage, whether a micro short circuit occurs on the signal cable N1 of the charging input circuit 4100.

The apparatus 4200 for controlling a charging micro short circuit in this embodiment of the present disclosure may be a charging IC or a PMU of the terminal device 4000. The voltage comparator 4201 of the apparatus 4200 for controlling a charging micro short circuit compares the reference voltage with the voltage of the signal cable N1 of the charging input circuit 4100. The processing unit 4202 determines, according to the difference between the voltages, whether the micro short circuit occurs on the signal cable N1 of the charging input circuit 4100. When the micro short circuit occurs on the signal cable N1 of the charging input circuit 4100, the processing unit 4202 sends to the application processor 4400 of the terminal device 4000, a signal used to indicate that the micro short circuit occurs on the charging input circuit 4100 such that the application processor 4400 controls the output device of the terminal device 4000 to emit an alert signal.

The alert signal may be a sound signal emitted by a horn of the terminal device 4000, may be an optical signal emitted by a screen, an indicator, a flash, or the like, or may be a vibration signal emitted by a vibration apparatus in the terminal device 4000, which is not limited in this embodiment of the present disclosure. The terminal device 4000 emits the alert signal such as sound and light to notify a user of an exception of a charging micro short circuit, and may further prompt the user to clean a Micro USB interface, replace a charging cable, or the like.

Optionally, in an embodiment of the present disclosure, when the difference between the voltage of the signal cable N1 of the charging input circuit 4100 and the reference voltage is greater than 0, and a time for which the difference between the voltage of the signal cable N1 of the charging input circuit 4100 and the reference voltage is greater than 0 is greater than a preset time threshold, the processing unit 4202 is further configured to determine that the micro short circuit occurs on the signal cable N1 of the charging input circuit 4100, and send, to the application processor 4400 of the terminal device 4000, a signal used to indicate that the micro short circuit occurs on the signal cable N1 of the charging input circuit 4100 such that the application processor 4400 controls the output device of the terminal device 4000 to emit an alert signal to prompt the owner of the terminal device 4000 that the micro short circuit occurs on the charging input circuit 4100 of the terminal device 4000, where the preset time threshold is greater than a designed communication signal period of the signal cable N1 of the charging input circuit 4100.

Further, in this embodiment of the present disclosure, the reference voltage is greater than 0 V and is less than the designed minimum output voltage value of the Vbus of the charging input circuit 4100, and may be set according to requirements. For example, a common output voltage range of the power cable of the charger is defined as 5 V±5%. In this case, the designed minimum output voltage value of the Vbus of the charging input circuit 4100 is 4.75 V, and the reference voltage may be set to 4.70 V (a value that is less than the designed minimum output voltage value of the Vbus may be selected according to experience, for example, 0.05 V is selected). Because a signal cable (for example, a data cable D−/D+) is connected to a Vbus in a charging circuit on a side of a charger using a resistor, when a micro short circuit occurs on the signal cable, a current to the ground is generated on the resistor. Because the resistor causes voltage division, the voltage of the signal cable experiences a voltage drop compared with the reference voltage. The voltage of the signal cable N1 of the charging input circuit 4100 is collected on the terminal device 4000, and when the difference between the voltage of the signal cable N1 of the charging input circuit 4100 and the reference voltage is greater than 0, and a time for which the difference is greater than 0 is greater than a preset time threshold, it is determined that a micro short circuit occurs on the signal cable N1 of the charging input circuit 4100.

When the voltage of the signal cable N1 of the charging input circuit 4100 is far less than the reference voltage, for example, a voltage of a data cable D−/D+ is always 0 V, it is considered that a used charger is a charger of a non-standard configuration, and a system may be triggered to prompt that the charger is not a dedicated charger, and stop a charging action.

Optionally, in this embodiment of the present disclosure, the signal cable N1 of the charging input circuit 4100 may include at least one of a D+, a D−, a dead-end ID, or an RX1+, an RX1−, an RX2+, an RX2−, a TX1+, a TX1−, a TX2+, a TX2−, an SBU1, an SBU2, a CC1, or a CC2 of a Type C interface defined in the USB 3.1 specification.

Therefore, according to the terminal device 4000 provided in this embodiment of the present disclosure, the difference between the voltage of the signal cable N1 of the charging input circuit 4100 and the reference voltage is compared such that it may be determined whether a micro short circuit occurs on a circuit on which the signal cable N1 of the charging input circuit 4100 is located. When the micro short circuit occurs on the circuit on which the signal cable N1 of the charging input circuit 4100 is located, an alert signal used to indicate that the micro short circuit occurs on the charging input circuit 4100 is sent such that the owner of the terminal device 4000 is prompted that the micro short circuit occurs on the charging input circuit 4100 of the terminal device 4000, which can improve charging security.

An embodiment of the present disclosure further provides a charging system, including a charger and the terminal device 4000 described in the foregoing embodiment. The charger includes a charging interface, the charging interface includes a power cable, a ground cable, and a signal cable, and the power cable of the charging interface is connected to the signal cable of the charging interface using a resistor.

In addition, in this embodiment of the present disclosure, two voltage comparators 3201, 4201 of the apparatus 3200 for controlling a charging micro short circuit of the terminal device 3000 and the apparatus 4200 for controlling a charging micro short circuit of the terminal device 4000 may further be combined for usage, which is not described in detail again in this embodiment of the present disclosure.

It should be understood that, in this embodiment of the present disclosure, a resistance value of the resistor should satisfy a voltage drop, generated by the resistor, of a micro short circuit current of the signal cable is sufficiently large, and when a micro short circuit occurs, a voltage of the signal cable may be less than a reference voltage. An example in which the reference voltage is slightly less than the designed minimum output voltage of the Vbus is used. For example, a designed output range of the Vbus is 4.5 V to 5.5 V. In this case, when an output voltage of the Vbus is 5.5 V, a voltage drop greater than 1 V should be generated when the micro short circuit current passes through the resistor such that the signal cable is less than the designed minimum voltage 4.5

V of the Vbus, and the voltage comparator may determine that a micro short circuit occurs.

Generally, a typical micro short circuit current is around 0.5 A, and is generally greater than 0.2 A. In this way, a resistance value of a corresponding resistor should be typically around 2 ohms such that a 0.2 A micro short circuit generates a sufficient voltage drop. When a resistance value is larger, a 0.5 V voltage drop is generated and identified more easily, and precision is improved. Therefore, preferably, the resistance value of the resistor is greater than or equal to 5 ohms.

It should be understood that, in this embodiment of the present disclosure, "Y corresponding to X" indicates that Y is associated with X, and that Y may be determined according to X. But it should be further understood that, that Y is determined according to X does not mean that Y is determined only according to X, and Y may also be determined according to X and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal device, comprising:
a charging input circuit comprising a power cable and a signal cable;
an application processor;
an apparatus coupled to the charging input circuit and the application processor and configured to control a micro short circuit on the charging input circuit, wherein the apparatus comprises:
 a voltage comparator configured to:
  acquire a first voltage of the power cable and a second voltage of the signal cable; and
  obtain a difference by subtracting the second voltage from the first voltage; and
 a processor coupled to the voltage comparator and configured to:
  determine a voltage threshold according to a product of a wiring resistance of the power cable and a current passing through the power cable;
  make a first determination that the difference is greater than the voltage threshold and that a time duration of any difference is greater than a first preset time threshold, wherein the first preset time threshold is greater than a communication signal period of the signal cable;
  make, based on the first determination, a second determination that the micro short circuit is occurring on the power cable;
  send, to the application processor in response to the second determination, the first signal to indicate that the micro short circuit is occurring on the power cable;
  compare the time duration of any difference with a preset time threshold, wherein the preset time threshold corresponds to a communication signal period of the signal cable;
  determine, according to the difference, whether the micro short circuit is occurring on the charging input circuit; and send, to the application processor, a first signal indicative of the micro short circuit occurring on the charging input circuit; and an output device coupled the application processor, wherein the application processor is configured to:
receive the first signal from the processor; and
control the output device to emit an alert signal, wherein the alert signal indicates the micro short circuit is occurring on the charging input circuit.

2. The terminal device of claim 1, further comprising a charging control circuit configured to control the charging input circuit to stop current input when the micro short circuit is occurring on the charging input circuit.

3. The terminal device of claim 1, wherein the processor is further configured to:
make a first determination that the difference is less than 0 volts (V) and that the time duration of any difference is less than 0 V is greater than a second preset time threshold, wherein the second preset time threshold is greater than a communication signal period of the signal cable;
make, based on the first determination, a second determination that the micro short circuit is occurring on the signal cable of the charging input circuit; and
send, to the application processor in response to the second determination, the first signal to indicate that the micro short circuit is occurring on the signal cable.

4. The terminal device of claim 1, wherein the apparatus comprises a charging integrated circuit (IC).

5. The terminal device of claim 1, wherein the apparatus comprises a power management device.

6. The terminal device of claim 1, wherein the signal cable is configured to transmit a control signal.

7. The terminal device of claim 1, wherein the signal cable is configured to transmit a data signal.

8. The terminal device of claim 1, further comprising a battery coupled to the charging input circuit, wherein the charging input circuit is configured to charge the battery.

9. The terminal device of claim 1, wherein the alert signal comprises a sound signal, an optical signal, an indicator, a flash, or a vibration signal.

10. A method for detecting a micro short circuit in a terminal device, comprising:
supplying a first voltage and a second voltage to the terminal device, wherein the terminal device comprises:
a charging input circuit comprising a power cable and a signal cable;
an apparatus coupled to the charging input circuit, wherein the apparatus comprises a voltage comparator and a processor;
an application processor coupled to the apparatus; and
an output device coupled to the application processor;
acquiring, by the voltage comparator, the first voltage of the power cable;
acquiring, by the voltage comparator, the second voltage of the signal cable;
obtaining, by the voltage comparator, a difference by subtracting the second voltage from the first voltage;
determining, by the voltage comparator, whether the micro short circuit is occurring on the charging input circuit according to the difference;
determining, by the processor, a voltage threshold according to a product of a wiring resistance of the power cable and a current passing through the power cable;
making, by the processor, a first determination that the difference is greater than the voltage threshold and that a time duration of any difference is greater than a first preset time threshold, wherein the first preset time threshold is greater than a communication signal period of the signal cable;
making, by the processor based on the first determination, a second determination that the micro short circuit is occurring on the power cable;
sending, by the processor in response to the second determination, the first signal to the application processor to indicate that the micro short circuit is occurring on the power cable;
comparing, by the processor, the time duration of any difference with a preset time threshold, wherein the preset time threshold corresponds to a designed communication signal period of the signal cable;
sending, by the processor, a first signal indicative of the micro short circuit occurring on the charging input circuit to the application processor; and
controlling, by the application processor, the output device to emit an alert signal that indicates the micro short circuit is occurring on the charging input circuit.

11. The method of claim 10, wherein the terminal device further comprises a charging control circuit, and wherein the method further comprises controlling, by the charging control circuit, the charging input circuit to stop current input when the micro short circuit is occurring on the charging input circuit.

12. The method of claim 10, wherein the processor is further configured to:
making, by the processor, a first determination that the difference is less than 0 volt (V) and that the time duration of any difference is less than 0 V is greater than a second preset time threshold, wherein the second preset time threshold is greater than a communication signal period of the signal cable;
making, by the processor based on the first determination, a second determination that the micro short circuit is occurring on the signal cable of the charging input circuit; and
sending, by the processor in response to the second determination, the first signal to the application processor to indicate that the micro short circuit is occurring on the signal cable.

13. The method of claim 10, wherein the apparatus comprises a charging integrated circuit (IC).

14. The method of claim 10, wherein the apparatus further comprises a power management device.

15. The method of claim 10, further comprising transmitting, by the signal cable, a control signal.

16. The method of claim 10, further comprising transmitting, by the signal cable, a data signal.

17. The method of claim 10, wherein the terminal device further comprises a battery coupled to the charging input circuit, and wherein the method further comprises charging, by charging input circuit, the battery.

18. The method of claim 10, wherein the alert signal comprises a sound signal, an optical signal, an indicator, a flash, or a vibration signal.

* * * * *